United States Patent [15] 3,658,593
Caiola et al. [45] Apr. 25, 1972

[54] ELECTROCHEMICAL CELLS WITH LITHIUM NEGATIVE ELECTRODES

[72] Inventors: Amedee Jean-Claude Caiola; Henry Robert Guy, both of Grenoble; Jean-Claude Sohm, Meylan, all of France

[73] Assignee: Societe des Accumulateurs Fixes et de Fraction (Societe Anonyme), Romainville (Seine Saint-Denis), France

[22] Filed: Oct. 2, 1969

[21] Appl. No.: 863,202

[30] Foreign Application Priority Data

Oct. 4, 1968 France....................................168904

[52] U.S. Cl..................................................136/6, 136/155
[51] Int. Cl........................................................H01m 43/06
[58] Field of Search........................................136/6, 154, 155

[56] References Cited

UNITED STATES PATENTS 3,567,515  3/1971  Maricle et al...........................136/154
3,468,716  9/1969  Eisenberg..........................136/154 X

FOREIGN PATENTS OR APPLICATIONS 1,100,163  1/1968  Great Britain........................136/155
1,541,885  10/1968  France...................................136/154

Primary Examiner—Donald L. Walton
Attorney—Kenyon & Kenyon Reilly Carr & Chapin

[57] ABSTRACT

Electrochemical cells utilizing lithium negative electrodes capable of discharge at high rate in which the lithium electrode operates in substantially insoluble manner utilizing a non-aqueous electrolyte in which lithium and its oxidation products formed during discharge are insoluble, in which the lithium is not corroded and which has acceptable conductivity and in which excessive electrode polarization and passivation is prevented. The composition of the non-aqueous electrolyte comprises at least a solution of a tetrabutylammonium salt in propylene carbonate and advantageously a solution of tetrabutylammonium chloride $(C_4H_9)_4 NCl$ in propylene carbonate mixed with tetrabutylammonium perchlorate. The concentration of tetrabutylammonium salts in propylene carbonate is preferably in the range of 0.5 to 1 mole per liter and advantageously the ratio of tetrabutylammonium perchlorate concentration to tetrabutylammonium chloride concentration expressed in moles per liter does not exceed 10.

7 Claims, 5 Drawing Figures

Patented April 25, 1972
3,658,593
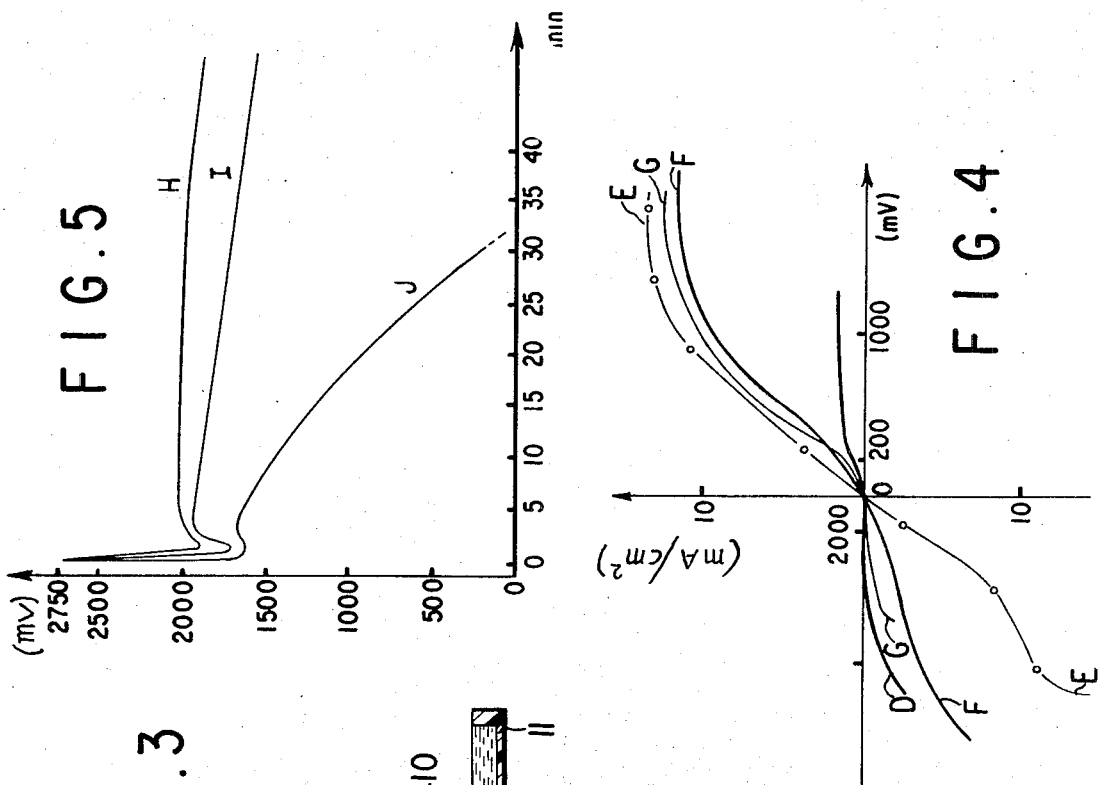
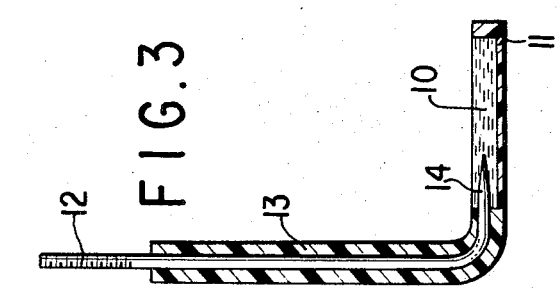
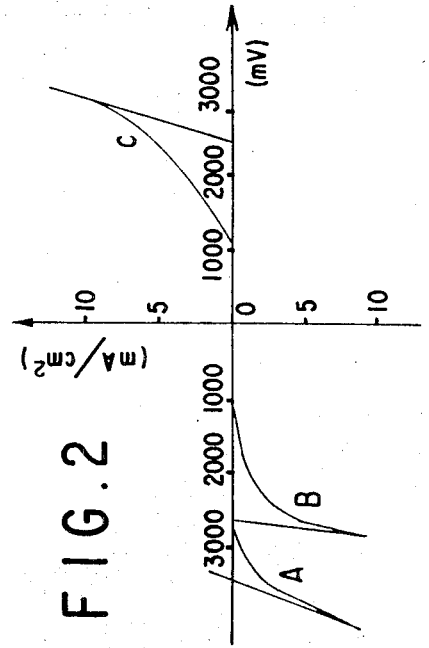
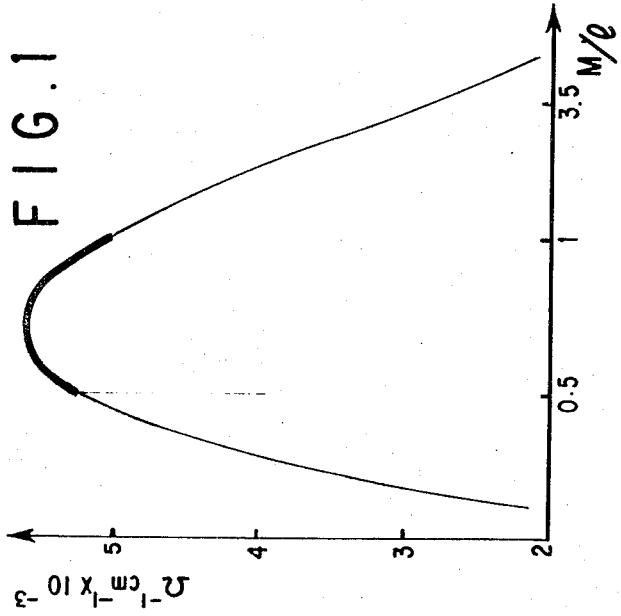
INVENTORS
AMEDÉE JEAN-CLAUDE CAIOLA
HENRI ROBERT GUY
BY JEAN CLAUDE SOHM
ATTORNEYS

ELECTROCHEMICAL CELLS WITH LITHIUM NEGATIVE ELECTRODES

RELATED APPLICATIONS

Related applications, Ser. Nos. 643,946, now U.S. Pat. No. 3,542,601; 693,320, now U.S. Pat. No. 3,542,602; 695,311, now U.S. Pat. No. 3,533,853; 718,974, now U.S. Pat. No. 3,511,716 and 773,015, now U.S. Pat. No. 3,540,938 filed respectively on or about June 6, 1967; Dec. 23, 1967; Dec. 26, 1967; Mar. 21, 1968; and Nov. 4, 1968 are co-pending.

BRIEF SUMMARY OF INVENTION

Lithium electrodes are of great interest since lithium is an electronegative metal on the one hand and has a low atomic weight on the other hand. Lithium used as a negative electrode in an electrochemical cell is therefore able to yield high power per unit of volume or mass.

Lithium has the further advantage of a high reaction rate in the oxided lithium-reduced lithium system and a relative inertia to the traces of water which may be contained in organic solvents.

When lithium is used as negative electrode in an electrochemical cell, due to its strong electro-negativity, it is necessary to use electrolytes of the non-aqueous type which do not corrode lithium. The original aim has been to provide primary cells in which the lithium electrode is able to be discharged at a very high rate. In this case, the negative electrode advantageously operates by dissolving during discharge so that its polarization is prevented.

The same view has been taken of a soluble negative lithium electrode during the subsequent development of secondary cells utilizing a rechargeable lithium electrode.

When utilizing an electrode of the soluble type in a secondary or rechargeable cell, during discharge, the active metal of the electrode is oxided and dissolved in the electrolyte in its oxided state, is reduced and electroplated on the conductive carrier of the negative electrode during charging.

However, with such a type of electrode, during discharge, the electrolytic deposits of the metal constituting the active material of the negative electrode are not obtained in a coherent and uniform shape. Needles and trees tend to form in such deposits. Such needles and trees, on growing, may build conductive bridges between two electrodes and thus cause short-circuiting. The cell can then definitely fail and in all events its life is much shortened.

In order to prevent such short-comings, and object of this invention is to provide a secondary cell in which the lithium electrode operates in a substantially insoluble way. However, the operation of such electrodes of the insoluble type at rates sufficiently high to be of any practical use, gives rise to a number of problems, one of the most important of which being prevention of the polarization or passivation of the insoluble lithium electrode. First, a satisfactory electrolyte must be found, i.e., one in which lithium and its oxidation products formed during discharge are insoluble, in which lithium is not corroded, which has a suitable conductivity and in which the electrodes are not too much polarized and passivated during the cell operation.

In short, the desired electrolyte must be sufficiently conductive, must not react with lithium, and must not dissolve the product of the oxidation reaction of lithium during discharge. Further, the negative lithium electrode must supply high rate discharges without any substantial polarization.

This invention comprises associating a negative lithium electrode and an electrolyte having a particular composition so that this electrode operates as a substantially insoluble electrode, and is able to yield sufficiently high rate discharges.

According to one feature of the invention, the electrolyte associated with the negative lithium electrode comprises at least a solution of a tetrabutylammonium salt in propylene carbonate, and advantageously a solution of tetrabutylammonium chloride $(C_4H_9)_4$ NCl in propylene carbonate.

According to another feature of the invention, the electrolytic oxidation of lithium being caused by the chloride ions, the negative electrode uses the oxidation reduction system LiCl/Li.

According to still another feature of the invention tetrabutylammonium perchlorate $(C_4H_9)_4$ $NClO_4$ is added to the electrolyte and this increases the permissible maximum density of charging current without polarization.

According to a preferred embodiment of the invention, the concentration of tetrabutylammonium salts in propylene carbonate is in the 0.5 to 1 mole per liter range.

Advantageously, the ratio of tetrabutylammonium perchlorate concentration to tetrabutylammonium chloride concentration expressed in moles per liter does not exceed 10.

The invention will be more clearly understood with reference to the following detailed description, giving some experimental data and illustrated in the accompanying drawings, given merely as examples, and in which:

FIG. 1 shows a curve illustrating the dependence of the conductivity of a solution of tetrabutylammonium chloride in propylene carbonate relative to its concentration at ambient temperature, the conductivity being expressed in mho/cmx $10^{-3}$ and being plotted as ordinates and the mole concentration in moles per liter of the solution being plotted as abscissae;

FIG. 2 shows curves defining the electro-active domain of propylenecarbonate containing $NBut_4Cl$ 0.5 M/l. Curve A corresponding to a platinum electrode and curve B to a lithium electrode, and in this figure, the current densities in $mA/cm^2$ have been plotted as ordinates and the oxidation - reduction potentials in mV referred to the AgCl/Ag electrode have been plotted as abscissae;

FIG. 3 is a cross-sectional view of a lithium electrode used in a cell according to the invention;

FIG. 4 shows polarization curves of an insoluble lithium electrode Li/LiCl immersed in an electrolyte constituted by a solution in propylene carbonate of:

For Curve D: $NBut_4Cl$ 0.5 M/l;
For Curve E: $NBut_4Cl$ 0.2M/l + $NBut_4$ $ClO_4$ 0.9 M/l
For Curve F: $NBut_4Cl$ 0.1 M/l + $NBut_4$ $ClO_4$ 0.7 M/l
For Curve G: $NBut_4Cl$ 0.1 M/l + $NBut_4$ $ClO_4$ 1 M/l respectively;

FIG. 5 shows oxidation curves at constant current intensity of a lithium electrode immersed in an electrolyte constituted by a $NBut_4Cl$ 0.2 M/l + $NBut_4ClO_4$ 0.9 M/l + solution in propylene carbonate, curves H, I and J corresponding to discharge rates of 5.7 and 10 $mA/cm^2$ respectively. In this figure, the discharge times expressed in minutes have been plotted as abscissae and the lithium electrode voltages referred to the AgCl/Ag electrode expressed in millivolts have been plotted as ordinates.

DETAILED DESCRIPTION

*Solubility tests of salts ionizable in organic solvents in which lithium is not corroded and stability of lithium in such electrolytes.*

Some polar organic solvents are reported to be inert towards lithium. Solvents put in contact with lithium at ambient temperature for a period of 5 months are shown in Table I. A slight continuous bubbling has been observed with respect to dimethylsulfoxide, but no reaction has been found to occur between lithium and the four other solvents.

TABLE I

[Physical properties of solvents compatible with lithium]

| Solvents | Structural formula | Melting point (° C.) | Boiling point (° C.) | Specific gravity | Dielectric constant |
|---|---|---|---|---|---|
| Propylene carbonate | $CH_2$—$CH$—$CH_3$ $\|$ $\|$ O O \\ / C=O | −49 | 241 | 1.19 | 64 |
| Dimethyl sulfoxide | $CH_3$ \\ S=O / $CH_3$ | 18.4 | 189 | 1.10 | 46 |

TABLE I—Continued
[Physical properties of solvents compatible with lithium]

| Solvents | Structural formula | Melting point (° C.) | Boiling point (° C.) | Specific gravity | Dielectric constant |
|---|---|---|---|---|---|
| Butyrolactone | CH₂—CH₂<br>\|    \|<br>CH₂   O<br>  \  /<br>   C=O | −42 | 206 | 1.12 | 39 |
| Tetrahydrofuran | CH₂—CH₂<br>\|    \|<br>CH₂  CH₂<br>  \  /<br>   C | −65 | 64 | 0.888 | 7.4 |
| Diethyl sulfate | O=S=O<br>/ \<br>OC₂H₅O C₂H₅ | −24.5 | 208 | 1.777 | 29 |

The solubilities of lithium chloride, tetramethylammonium and tetrabutylammonium chlorides in these solvents also have been determined: the results are recorded in Table II below.

TABLE II

| Solvents | LiCl | NMet₄Cl | NBut₄Cl |
|---|---|---|---|
| Propylene Carbonate | Insoluble | Insoluble | Soluble |
| Dimethyl-sulfoxide | Soluble | Insoluble | Soluble |
| Butyrolactone | Soluble | Insoluble | Soluble |
| Tetrahydrofuran | Soluble | Insoluble | Soluble (0.5 M) |
| Diethyl Sulfate | Insoluble | – | Soluble |
| Ethylene Carbonate 80% + propylene carbonate (20%) | Soluble | | Soluble |

The only solvents suitable for a LiCl/Li electrode operating in insoluble conditions are those in which LiCl is insoluble and in which a tetralkylammonium salt is soluble. Thus, as seen from Table II, among the tested materials only propylene carbonate and diethyl sulfate with NBut₄Cl are feasible. However, the diethyl sulfate +NBut₄Cl+Li mixture has been found to react after a few days and the entire electrolyte gels into a whitish mass. Therefore, propylene carbonate is the only remaining suitable solvent. Another tested solvent constituted by a mixture of ethylene carbonate and propylene carbonate did not give satisfactory results, lithium chloride being soluble in this solvent.

In further testing, a piece of lithium was then immersed in propylene carbonate containing 0.5 mol/liter tetrabutylammonium chloride for a period of 5 months; no reaction was found to occur. It should be noted that tetrabutylammonium chloride has been chosen from among the other tetrabutylammonium salts because it is easily prepared.

The electromotive force of a cell made of two reversible electrodes of the insoluble types, namely, LiCl/Li and AgClAg, immersed in the same electrolyte containing the Cl⁻ion can be derived from the variation of free enthalpy during the following reaction:

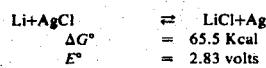

$$Li+AgCl \rightleftarrows LiCl+Ag$$
$$\Delta G° = 65.5 \text{ Kcal}$$
$$E° = 2.83 \text{ volts}$$

This value does not depend from the selected solvent since the above reaction does not involve any dissolved species. Therefore, if the insoluble electrode LiCl/Li operates in a reversible manner, its potential referred to the AgCl/Ag electrode should be about −2.83 volts.

Tetrabutylammonium chloride is very soluble in propylene carbonate; a 3 moles per liter solution is obviously not saturated. FIG. 1 shows the variation of the solution conductivity as a function of concentration. At ambient temperature, the maximum conductivity ($5.6 \times 10^{-3} \Omega^{-1} cm^{-1}$) is obtained for a 0.6 moles/liter concentration. Thereafter, conductivity very steeply decreases as concentration increases: this behavior is rather different from that of aqueous solutions.

Therefore, it appears advantageous to use solutions ranging from 0.5 M to 1.0 M/l tetrabutylammonium chloride in propylene carbonate so that the cell has the minimum electric resistance under the usual ambient temperature conditions of operation.

In order to determine the effect of possible water traces, tests were made with 97 percent propylene carbonate. Water was removed from the 3 percent impurities after dissolution of NBut₄Cl by stirring over calcium hydride for a period of about 15 hours. 50 to 70 ppm of water then remain in solution. Calcium hydroxide formed by the reaction and the excess of hydride are removed by centrifugation. Experience has shown that a further dehydration was not necessary since when lithium reduces the last traces of water, LiCl is mainly formed. This is due to the fact that the Cl⁻ion is present in the solution whereas no OH⁻is present; the solubility coefficient of LiCl is therefore reached before that of Li OH, though lithium hydroxide is less soluble than lithium chloride in propylene carbonate. More accurate measurements have shown that the solubility of LiCl in propylene carbonate is $3 \times 10^{-2}$ mole/liter. Lithium chloride which is the discharge product of lithium, may, therefore, be considered as substantially insoluble in the electrolyte developed according to the invention.

In order to study the electroactivity domain of propylene carbonate containing NBut₄Cl, a H-shaped cell has been used, its two compartments being separated by sintered glass (porosity n°3) to prevent mixing oxidation and reaction products of the electrolyte. As may be seen from FIG. 2, the electrolyte is reduced at substantially more negative potentials on the lithium electrode, viz. − 3,400 mV (Curve A), than on the platinum electrode, viz. −2,600 mV (curve B). Taking into account the fact that the oxidation - reduction potential of the LiCl/Li system is about −2,800 mV, it may be seen that during cathode polarization of the lithium electrode, therefore, during charging, lithium chloride will be reduced first, the electrolyte being reduced on lithium only after the completion of the first reduction, i. e. that of the active material.

This result is very important and was unforeseen. If as is usually the case, the reduction potential was taken as that on the platinum-electrode, this reduction would be predicted at −2,600 mV, therefore, before that of the negative active material (−2,800 mV), and charging (reduction) of the discharged negative active material would be deemed impossible since electrolyte reduction should take place first. Therefore, it is due to the fact that the reduction potential of the electrolyte is shifted on a lithium cathode towards a more electronegative value than that oxidation-reduction system LiCl/Li, that charging (reduction of oxided lithium) can be effected before the decomposition of the electrolyte. This very favorable fact obtained according to the invention is a consequence of the fact that lithium is in a metastable state with respect to the electrolyte.

In the same FIG. 2, the curve C relates to the anode polarization in the same electrolyte.

FIG. 3 will now be referred to as illustrating an experimental device used according to the invention.

A lithium electrode is constituted by a disk 10 having a 6 cm² area and a 5 mm. thickness, prepared by punching, and then forced into a Teflon (polytetrafluoroethylene) mold 11. Such operations are effected in glove boxes under an argon atmosphere. A nickel wire 12 coated with Teflon 13 is sharpened to a point at one end 14, and is laterally driven 1 cm deep into the lithium disk 10 (FIG. 3). An excellent electrical contact is thus obtained. The surface of the electrode is physically cleaned just before it is immersed in the electrolyte. The lithium chloride formed by oxidation is not adherent; in order to keep it upon the electrode, the latter is placed horizontally and any stirring of the electrolyte is avoided. The cell is a glass one, provided with a metal cover and contains about 150 ml of electrolyte. Dry argon is used as atmosphere. The platinum counter-electrode is placed in a compartment closed by a sintered glass wall. The reference electrode AgCl/Ag and the lithium electrode are immersed in the same electrolyte.

The LiCl/Li electrode in a cell of this type then has been studied in connection with two different kinds of electrolyte.

Using as a first electrolyte: propylene carbonate + 0.5 mole/l NBut$_4$Cl (the result is shown in Curve D of FIG. 4).

Lithium is anodically oxided for a period of 10 minutes at 0.5 A/cm$^2$ in the electrolyte. Current is then cut off and voltage is quickly stabilized at a $-2,740$ mV (with $\pm$ 10 mV accuracy), value as referred to the AgCl/Ag electrode.

This is in very good agreement with theory since the predicted value was $-2,830$ mV.

Curve D of FIG. 4 shows the dependence of the current density from the lithium electrode voltage in the steady state. In other words, this is the polarization curve of an insoluble electrode Li/LiCl in the selected first electrolyte. A level anode current (corresponding to discharge) is obtained at 1.10 mA/cm$^2$, this level being probably due to the Cl$^-$ion diffusion. The current slowly decreases as time passes for the Cl$^-$ion diffuses through a LiCl layer of increasing thickness. After 10 hours of oxidation at the potential of the reference electrode the presence of LiCl was observed by means of X-ray analysis. The cathode branch of the voltage-current density curve (left part of the curve D corresponding to charge) does not show any plateau and is limited by the solvent reduction towards $-3,400$ mV as referred to the AgCl/Ag electrode.

Using as a second electrolyte, propylene carbonate $+$NJ But$_4$Cl+NBut$_4$ClO$_4$(the results are shown in curves E, F and G of FIG. 4).

The oxidation of lithium still gives chloride since lithium perchlorate is soluble in propylene carbonate up to 1 mole/l. Polarization curves of the lithium electrode have been plotted for various values of both salt concentrations. The results are shown in the following table III.

TABLE III

| Concentration in NBut$_4$-cl 10$_4$ M/l | in NBut$_4$-Cl M/l | Reference of curve in FIG. 4 | Limiting anodic current density | Electrolyte |
|---|---|---|---|---|
| 0.9 | 0.2 | E | 13.8 mA | (1) |
| 0.7 | 0.1 | F | 11.8 mA | (2) |
| 1 | 0.1 | G | 13 mA | (3) |

It may be seen that the presence of the perchlorate ion increases the limiting anodic current density, i. e., the limiting discharge current. In the case of curves E and F, only LiCl was found by X-ray analysis. However, in the case of curve G a mixture of lithium chloride and perchlorate was found, lithium perchlorate being present as traces.

The meaning of curve D on the one hand, and curves E,F, and G on the other hand can be clarified, mainly as relates to anodic oxidation of lithium. These curves show the dependence of the current density upon the steady state voltage, i. e. at a rate stabilized for a given period. But this period does not extend e. g. to the whole length of time of electrode discharge in the case of an anodic polarization corresponding to the right part of FIG. 4. The meaning of these curves is as follows: they define the trend of the system evolutions and they give a comparison of such evolutions. Thus it may be concluded from curve D on the one hand and curves E, F and G on the other hand, that the discharge without polarization of the lithium electrode in the electrolyte constituted by tetrabutylammonium chloride dissolved in propylene carbonate, is clearly less advantageous than the discharge in an electrolyte constituted by tetrabutylammonium chloride and tetrabutylammonium perchlorate dissolved in propylene carbonate. The ratio of the respective current densities was as about 1 to 12. Thus, the addition of tetrabutylammonium perchlorate may be seen to have a very significantly favorable effect upon the lithium electrode ability to discharge without polarization. This actually constitutes an important feature of the invention, allowing the obtention of high discharge rates with electrodes of the insoluble type.

Referring now to table III, it may be seen that when the concentration ratio of NBut$_4$ClO$_4$ to NBut$_4$Cl in moles per liter varies from 0.9/0.2=4.5 to 1/0.1=10 going through 0.7/0.1=7, the value of the limiting anodic current density does not vary much since it remains in the 13.8 to 11.8 mA cm$^2$ range. But it has been found that no lithium perchlorate was found in the electrolyte for the 4.5 and 7 ratios whereas traces were found for the 10 ratio. As the lithium of this lithium perchlorate comes from dissolved negative active material, it may be seen that in order to remain within the scope of the invention which relates to the insoluble operation of the lithium electrode, the ratio of the concentrations expressed in moles per liter of tetrabutyl ammonium perchlorate and chloride in propylene carbonate should not exceed 10. This also constitutes another important feature of the invention.

In FIG. 5, the constant current oxidation curves (i.e. the curves of discharge at constant current intensity) of lithium have been plotted for electrolyte solution (1) of table III which gives higher anodic current densities.

Curve H corresponds to a discharge at 5 mA/cm$^2$. The curve begins at the steady state voltage, i. e. about $-2,750$ mV as referred to the AgCl/Ag electrode. The discharge voltage decreases with time, which corresponds to an overvoltage of the lithium electrode. The maximum value of this overvoltage corresponding to the trough of the discharge voltage is probably due to a lag in crystallization which remained constant during the time of the test, this time being about 50 minutes. The plateau corresponding to discharge is substantially linear at about $-2,000$ mV, which shows that no polarization perturbs the discharge.

Curve I corresponds to a 7 mA/cm$^2$ discharge; it is similar to the preceding one but the overvoltage slowly increases as time passes, which means that there is a slight passivation or polarization.

Curve J corresponds to a 10 mA/cm$^2$ discharge; it shows a steep increase of overvoltage as time passes, which means that the electrode is strongly polarized.

It may, therefore, be concluded that the lithium electrode associated with an electrolyte constituted by tetrabutylammonium perchlorate and chloride dissolved in propylene carbonate, though operating as an insoluble electrode, can be discharged at a permanent rate, such as 6 mA/cm$^2$, without polarization, i. e., without passivation.

Due to this invention, the operation of the lithium electrode is satisfactory both for its substantial insolubility as for its ability to be discharged at relatively high rates.

Thus, storage cells can be made with such electrodes, the said cells having a longer life than those of storage cells in which the negative electrode operates as a soluble electrode.

Another advantage is the simpler structure of the cell in which the separator can be made of highly porous insulating materials such as polyamide fiber felts, since there is no longer any risk of short-circuiting due to the fact that no lithium needles are formed during charging. Thus, special semi-permeable membranes need not be used.

The invention is not limited to the described and illustrated embodiments which have been given as examples only. More particularly, the technical equivalents of the described means, and their combinations are in the spirit of the invention and fall within the scope of the appended claims.

What is claimed is:

1. An electrochemical generator comprising a strongly electro-negative electrode of lithium, a positive electrode and a non-aqueous electrolyte comprising a mixed solution of tetrabutylammonium perchlorate and tetrabutyl ammonium chloride in propylene carbonate, said electrodes each being reversible and insoluble in the said electrolyte.

2. An electrochemical generator according to claim 1, wherein the concentration of the said solution in propylene carbonate is in the range of 0.5 to 1 mole per liter.

3. An electrochemical generator according to claim 1, wherein the concentration ratio of tetrabutylammonium perchlorate to tetrabutylammonium chloride expressed in moles per liter is <about 10.

4. An electrochemical generator according to claim 1, wherein said positive electrode is of the Ag/AgCl type.

5. A non-aqueous electrolyte for an electrochemical cell having a strongly electro-negative Li/LiCl electrode comprising a mixed solution of tetrabutyl ammonium perchlorate and tetrabutyl ammonium chloride in propylene carbonate.

6. A non-aqueous electrolyte according to claim 5, wherein the concentration of mixed solution in propylene carbonate is in the range of about 0.5 to 1 mole per liter.

7. A non-aqueous electrolyte according to claim 5, wherein the concentration ratio of the tetrabutylammonium perchlorate to tetrabutylammonium chloride expressed in moles per liter is < about 10.

* * * * *